United States Patent
Simms et al.

(10) Patent No.: US 7,793,321 B2
(45) Date of Patent: Sep. 7, 2010

(54) DELIVERING A GEOGRAPHIC-SPECIFIC COMPREHENSIVE PROGRAM GUIDE

(75) Inventors: Andrew M. Simms, Redmond, WA (US); Stephen Richard Husak, Snoqualmie, WA (US); Patricia Ellen Martin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1085 days.

(21) Appl. No.: 10/939,618

(22) Filed: Sep. 13, 2004

(65) Prior Publication Data

US 2006/0037060 A1    Feb. 16, 2006

Related U.S. Application Data

(63) Continuation of application No. 10/917,890, filed on Aug. 13, 2004, now abandoned.

(51) Int. Cl.
*G06F 3/00* (2006.01)
*G06F 13/00* (2006.01)
*H04N 5/445* (2006.01)

(52) U.S. Cl. .............................. 725/39; 725/48; 725/56
(58) Field of Classification Search .................. 725/39, 725/48, 56, 116, 117, 118
See application file for complete search history.

(56) References Cited

U.S. PATENT DOCUMENTS

| 5,666,645 | A |  | 9/1997 | Thomas et al. |
| 5,758,258 | A |  | 5/1998 | Shoff et al. |
| 5,758,259 | A |  | 5/1998 | Lawler |
| 5,808,694 | A |  | 9/1998 | Usui et al. |
| 5,990,883 | A |  | 11/1999 | Byrne et al. |
| 6,003,041 | A | * | 12/1999 | Wugofski ................. 707/104.1 |
| 6,184,877 | B1 |  | 2/2001 | Dodson et al. |
| 6,490,001 | B1 |  | 12/2002 | Shintani et al. |
| 6,766,526 | B1 | * | 7/2004 | Ellis ............................ 725/57 |
| 6,910,191 | B2 |  | 6/2005 | Segerberg et al. |
| 6,992,728 | B2 |  | 1/2006 | Takagi et al. |
| 7,210,159 | B2 |  | 4/2007 | Roop et al. |
| 2001/0052124 | A1 | * | 12/2001 | Kim et al. ..................... 725/39 |

(Continued)

FOREIGN PATENT DOCUMENTS

DE        19501086 A1    9/1995

(Continued)

OTHER PUBLICATIONS

"ATSC Standard: Digital Television Standard (A/53), Revision C", May 21, 2004, 77 pages, Advanced Television Systems Committee, Washington DC.

(Continued)

*Primary Examiner*—Scott Beliveau
*Assistant Examiner*—Alan Luong
(74) *Attorney, Agent, or Firm*—Senniger Powers LLP

(57) ABSTRACT

Providing a program guide for digital and analog broadcast television channels specific to a geographic region. A computing device sends a program guide request including a geographic identifier to another computing device. In response, the other computing device filters a master program guide as a function of the geographic identifier to create the requested program guide. The created program guide includes a call sign, physical channel, major channel, and content listing for each of the digital broadcast television channels. In one embodiment, the digital broadcast television channels conform the Advanced Television Systems Committee (ATSC) standard.

25 Claims, 6 Drawing Sheets

U.S. PATENT DOCUMENTS

| | | | |
|---|---|---|---|
| 2002/0152267 A1 | 10/2002 | Lennon | |
| 2002/0178449 A1* | 11/2002 | Yamamoto et al. | 725/56 |
| 2003/0077067 A1 | 4/2003 | Wu et al. | |
| 2003/0110490 A1* | 6/2003 | Dew et al. | 725/37 |
| 2003/0135856 A1* | 7/2003 | Hancock et al. | 725/50 |
| 2003/0213001 A1* | 11/2003 | Yuen et al. | 725/136 |
| 2003/0233653 A1* | 12/2003 | Hwang et al. | 725/38 |
| 2004/0117831 A1 | 6/2004 | Ellis et al. | |
| 2004/0128686 A1* | 7/2004 | Boyer et al. | 725/51 |
| 2004/0193609 A1 | 9/2004 | Phan et al. | |
| 2005/0005293 A1* | 1/2005 | Park | 725/50 |
| 2005/0076232 A1 | 4/2005 | Kawaguchi | |
| 2005/0080788 A1 | 4/2005 | Murata | |
| 2005/0152686 A1 | 7/2005 | Takashimizu et al. | |
| 2005/0216942 A1 | 9/2005 | Barton | |
| 2005/0262528 A1 | 11/2005 | Herley et al. | |
| 2006/0167903 A1 | 7/2006 | Smith et al. | |
| 2006/0259926 A1 | 11/2006 | Scheelke et al. | |
| 2007/0002175 A1 | 1/2007 | Narushima et al. | |
| 2007/0061842 A1 | 3/2007 | Walter et al. | |
| 2008/0028101 A1 | 1/2008 | Dewa | |

FOREIGN PATENT DOCUMENTS

| | | | |
|---|---|---|---|
| EP | 1383325 A2 | 1/2004 | |
| FR | 2818074 A1 | 6/2002 | |
| WO | WO 99/35849 A1 | 7/1999 | |
| WO | WO 00/52928 A1 | 9/2000 | |
| WO | WO 00/72582 A1 | 11/2000 | |
| WO | WO 2004/051988 | 6/2004 | |

OTHER PUBLICATIONS

Crinon, Regis J., et al., "The ATSC Data Broadcast Standard", Proceedings of the 2000 ACM Workshops on Multimedia, 2000, pp. 59-62, ACM Press, New York.

Ehrmantraut, Michael, et al., "The Personal Electronic Program Guide—Towards the Pre-selection of Individual TV Programs", Proceedings of the Fifth International Conference on Information and Knowledge Management, 1996, pp. 243-250, ACM Press, New York.

Sheth, Amit, et al., "Video Anywhere: A System for Searching and Managing Distributed Heterogeneous Video Assets", ACM SIGMOD Record, Mar. 1999, pp. 104-109, vol. 28, Issue 1, ACM Press, New York.

Smyth, Barry, et al., "A Personalized Television Listings Service", Communications of the ACM, Aug. 2000, pp. 107-111, vol. 43, Issue 8, ACM Press, New York.

"Television Systems; Register of Country and Network Identification (CNI) and of Video Programming System (VPS) Codes", TR 101 231, EBU Web Version (Jun. 2003), 1998, 37 pages, European Telecommunications Standards Institute, European Broadcasting Union, France.

* cited by examiner

DELIVERING A GEOGRAPHIC-SPECIFIC COMPREHENSIVE PROGRAM GUIDE

TECHNICAL FIELD

Embodiments of the present invention relate to the field of broadcast video. In particular, embodiments of this invention relate to creating a program guide that includes listings for digital television broadcasts and analog television broadcasts.

BACKGROUND OF THE INVENTION

In the United States, the Federal Communications Commission (FCC) has mandated that all broadcast television stations enable digital broadcasts according to the Advanced Television Systems Committee (ATSC) by 2002, and by July 2005 all TV sets sold must be capable of receiving digital broadcasts. As such, digital television will be the primary mechanism for delivering television content within the next 3-5 years. Presently, over one thousand United States television stations have begun broadcasting high definition television (HDTV) in their markets. However, digital tuning involves new concepts such as physical, major and minor channels which will be initially unfamiliar to consumers and new hardware to receive digital broadcasts which will be used in addition to existing video sources such as analog television, digital cable, and video-on-demand. For example, an ATSC compatible tuner card enables a personal computer to receive ATSC television signals including HDTV programming.

Of paramount importance to consumers is locating programming utilizing the new standards which are available in their geographic area. While program listings are widely available for non-ATSC channels, programming and/or scheduling info is not readily available for ATSC channels. For example, while the FCC provides data for the ATSC channels (e.g., ownership, call signs, frequency of broadcast), the data does not include programming or scheduling information.

In one example, a computer user installs a new ATSC tuner card in a computer. The program guide on the computer needs a way to obtain and display programming and scheduling info for the ATSC channels to the user.

Accordingly, a system for matching ATSC channels to non-ATSC channels and generating geographic-specific guide data is desired to address one or more of these and other disadvantages.

SUMMARY OF THE INVENTION

Embodiments of the invention include a process of merging listing information (program titles, descriptions, ratings, etc.), lineup information (tuner positions, major/minor channels), and areas of availability (based on well known identifiers like postal codes or latitude/longitude coordinates) to produce relevant data which can be delivered to end-user devices over a variety of transmission mechanisms (web services, in-band data, packet radio). In an embodiment, the invention combines data about available digital services using database edit, transformation and load techniques, fuzzy logic, and textual comparison to generate a database that can be queried.

Programming and scheduling information is available for non-ATSC channels. Many non-ATSC stations broadcast on both ATSC and non-ATSC channels. In most instances, the programming and scheduling info is the same for both ATSC and non-ATSC channels. As such, the invention maps the non-ATSC channels to the ATSC channels to associate programming and scheduling info with the ATSC channels. The invention also includes a web service for delivering the merged programming and scheduling information to a computing device of a user.

The invention supports basic discovery of available digital services, discovery of digital programming, multiple source integration, and the promotion/sale of digital reception equipment.

In accordance with one aspect of the invention, a method obtains a geographic-specific program guide. The method includes determining a geographic identifier for a first computing device and generating a request for a program listing for digital broadcast television channels. The request includes the determined geographic identifier. The method further includes sending the generated request to a second computing device. The second computing device has access to a memory area storing the requested program listing. The method further receives the requested program listing from the second computing device. The received program listing includes the digital broadcast television channels and analog broadcast television channels specific to the geographic identifier.

In accordance with another aspect of the invention, one or more computer-readable media have computer-executable components to obtain a geographic-specific program guide for broadcast content. The components include a setup component for determining a geographic identifier for a first computing device and generating a request for a program listing for digital broadcast television channels. The request includes the determined geographic identifier. The interface component sends the generated request to a second computing device. The second computing device has access to a memory area storing the requested program listing. The interface component is further adapted to receive the requested program listing from the second computing device. The received program listing includes digital broadcast television channels and analog broadcast television channels specific to the geographic identifier.

In accordance with still another aspect of the invention, a method generates a geographic-specific program guide for broadcast content. The method includes receiving a request from a first computing device for a program listing for digital broadcast television channels. The received request includes a geographic identifier associated with the first computing device. The method further includes filtering a master program listing as a function of the received geographic identifier to create the requested program listing for the digital broadcast television channels and for analog broadcast television channels. The method also includes populating one or more objects with the requested program listing and sending the populated one or more objects to the first computing device.

In accordance with yet another aspect of the invention, one or more computer-readable media have computer-executable components to generate a geographic-specific program guide for broadcast content. The components include an interface component to receive a request from a first computing device for a program listing for digital broadcast television channels. The received request includes a geographic identifier associated with the first computing device. The components further include a guide creation component to filter a master program listing as a function of the received geographic identifier to create the requested program listing for the digital broadcast television channels and for analog broadcast television channels. The guide creation component further populates one or more objects with the requested program listing.

In accordance with another aspect of the invention, a system produces a program listing for digital broadcast television channels and analog broadcast television channels specific to a geographic region associated with a computing device. The system includes an interface for receiving a request from a computing device for a program listing for digital broadcast television channels. The request includes a geographic identifier associated with the computing device. The system further includes a memory area for storing a master program listing for digital broadcast television channels and analog broadcast television channels. The system also includes a processor configured to execute computer-executable instructions to filter the master program listing stored in the memory area as a function of the geographic identifier in the request received by the interface to create the requested program listing. The program listing created by the processor includes the digital broadcast television channels and analog broadcast television channels specific to the geographic identifier. The processor is further configured to execute computer-executable instructions to populate one or more objects with the program listing created by the processor.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Programming and scheduling information is available for analog broadcast television channels, but not readily available for digital broadcast television channels. The ATSC defines a standard for broadcasting digital television. An ATSC signal may either be high definition (HD) or standard definition (SD). ATSC lineup data includes logical channel numbers (e.g., major channels), tuning parameters (e.g., physical channel numbers), and associations with services (e.g., call signs) from which program data may be mapped. The physical channel represents the frequency set by the Federal Communication Commission (FCC) at which content is available. The major channel represents a "user-friendly" number that the content provider (e.g., broadcaster) uses for identification. In one embodiment, the physical channel and the major channel are integers each with a minimum value of 2 and a maximum value of 69 as set by the FCC. The content provider often sets this to the same number as the corresponding analog channel to provide a familiar user-experience for viewers who already know the content provider's analog service. For example, if a content provider has an analog broadcast on channel 9, the content provider broadcasts digital content on major channel 9 (e.g., physical channel 41).

Content providers typically simulcast their programs (e.g., broadcast the same content on both the analog channel (e.g., major channel 4) and one the digital channel (e.g., minor 4). By matching digital broadcast television data with analog broadcast television data, the analog program listings may be associated with the digital broadcast television channels.

While some embodiments herein are described with respect to the ATSC digital video standard, the invention is operable with any digital video standard.

Figure 1:
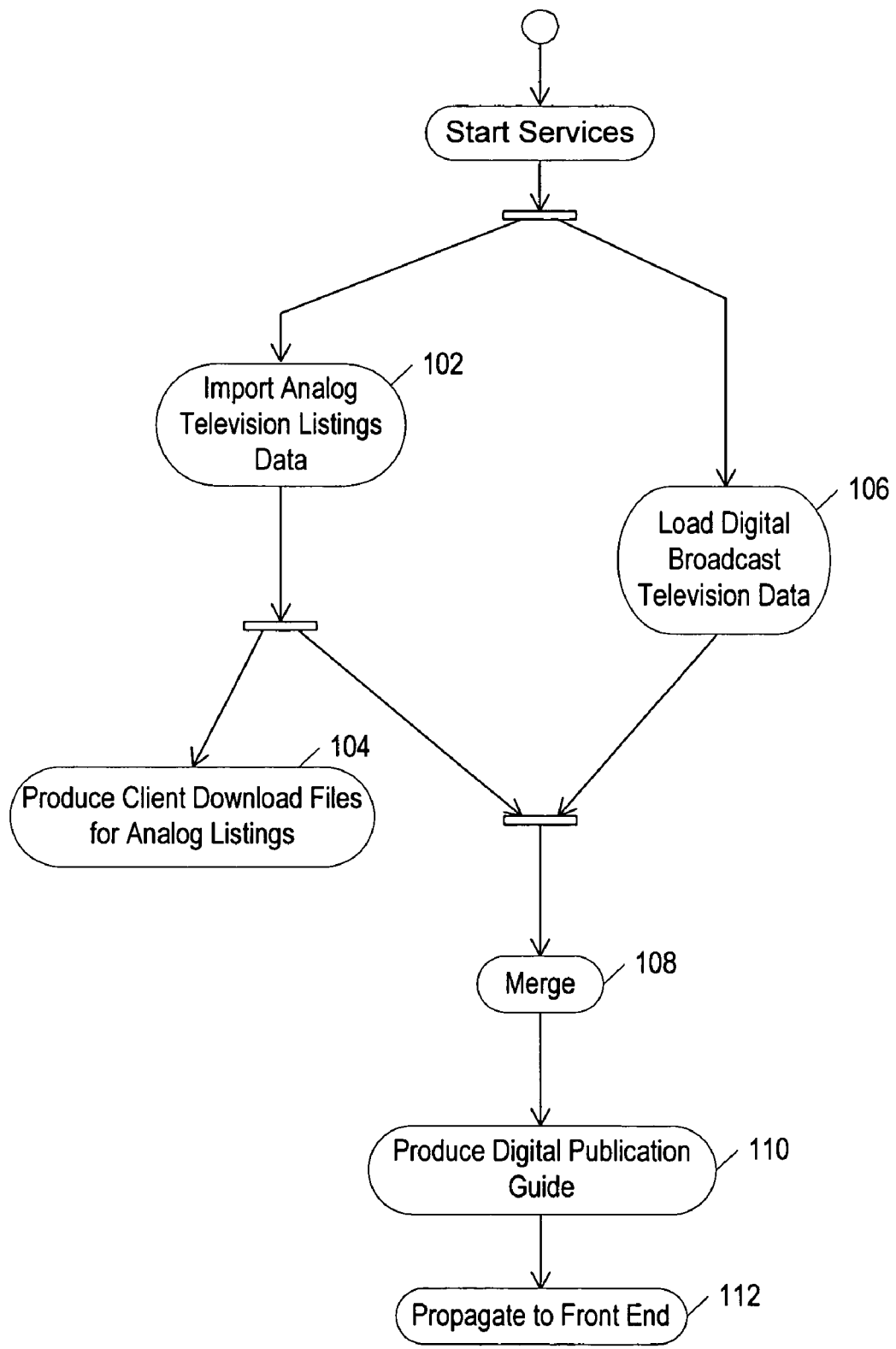
FIG. 1 is an exemplary flow chart illustrating the importation and merging of analog television listings and digital broadcast television data.

Referring first to FIG. 1, an exemplary flow chart illustrates the importation and merging of analog television listings and digital broadcast television data. The invention imports analog television listings data at 102 and produces client download files for the imported analog listings at 104. The invention further imports or loads digital broadcast television data or other digital tuning information from a provider (e.g., the Federal Communication Commission) at 106. The invention matches or otherwise merges the imported digital tuning information with the imported analog broadcast data at 108 to produce a digital publication guide at 110. The digital publication guide with the matched data is propagated to a front-end server as a database publication at 112. In one embodiment, the invention merges data representing the call signs for the digital and analog channels to enable the display of programming and scheduling information associated with each digital channel and its corresponding analog channel. Analog channels include cable channels, analog broadcast channels (e.g., channels available at a specific frequency), and satellite channels. The digital broadcast television data or other digital programming information captured from providers is used to produce a variety of client consumable data formats. Discovery information from multiple sources is combined with one or more client representations to build a combined guide experience which represents the union of available programming. In one embodiment, the digital television broadcast channel data conforms to the Advanced Television Systems Committee (ATSC) standard. However, the invention is not limited to the ATSC standard. Any appropriate digital television broadcast standard is within the scope of the invention.

Figure 2:
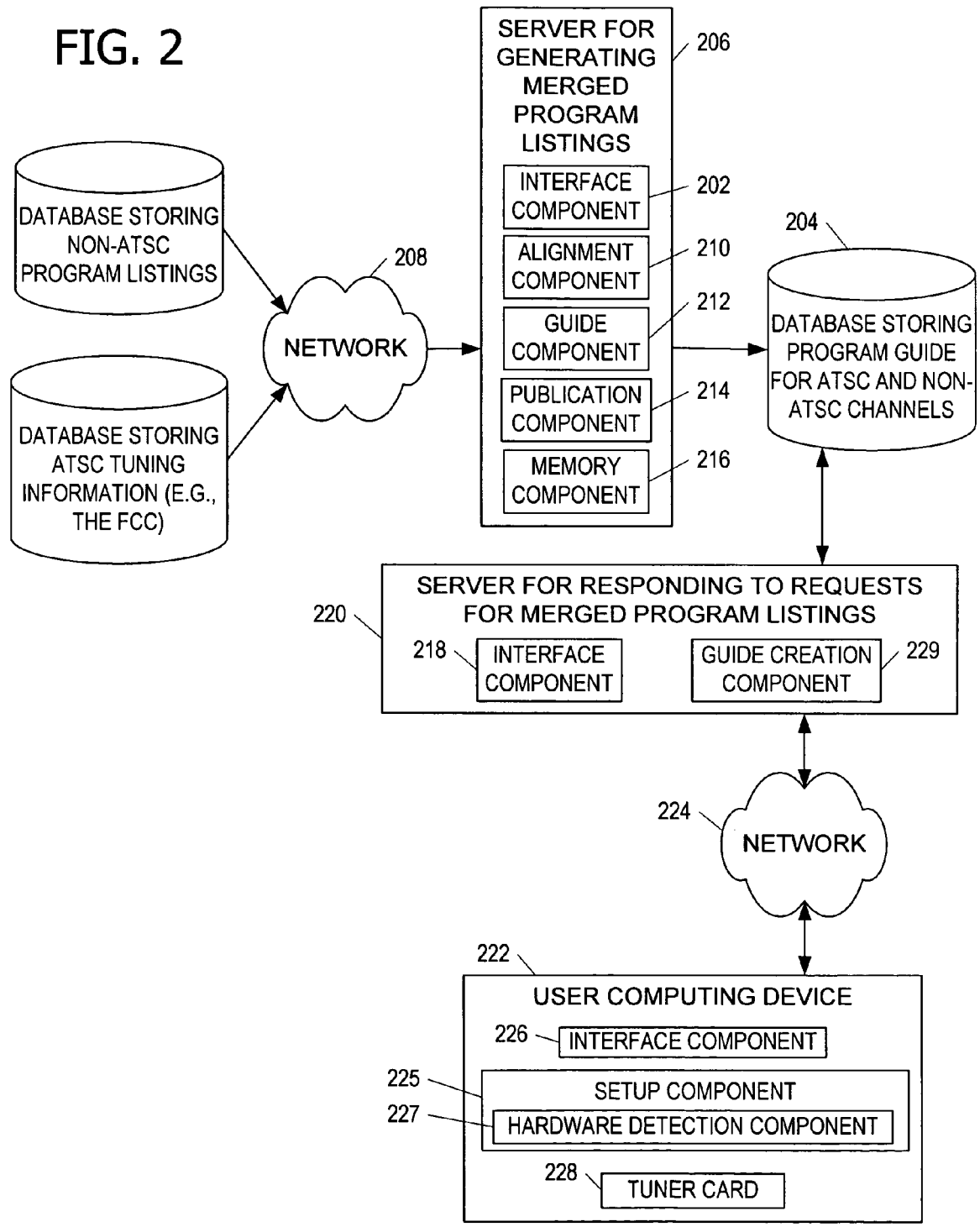
FIG. 2 is an exemplary block diagram illustrating a suitable broadcast video environment of the invention.

Referring next to FIG. 2, an exemplary block diagram illustrates a suitable broadcast video environment of the invention. In particular, the exemplary broadcast video environment includes an interface (e.g., interface component 202), a memory area (e.g., database 204), a processor (e.g., server 206), and a program guide. The interface receives digital broadcast television channel data (e.g., ATSC tuning information) and analog broadcast television channel data from a provider (e.g., via a network 208). The interface is further adapted to receive the program listings (e.g., the non-ATSC program listings) for the analog broadcast television channels from a provider. The memory area stores the digital broadcast television channel data and the analog broadcast television channel data received by the interface. The digital broadcast television channel data includes one or more of the following for each of the channels therein: a major channel number, a minor channel number, and a physical channel number. The digital broadcast television channel data includes a call sign (e.g., a string) for each of the digital broadcast television channels. The analog broadcast television data includes a call sign (e.g., a string) for each of the analog broadcast television channels.

Alternatively or in addition, the digital broadcast television channel data and the analog broadcast television data include an in-band identifier for each of the channels. The in-band identifier (e.g., a country and network identifier) is encoded by the broadcaster or other content provider for use by a consumer electronic device.

In one embodiment, one or more computer-readable media associated with the server 206 for generating merged program listings have computer-executable components for providing content listings for digital television broadcasts. The components include the interface component 202, an alignment component 210, a guide component 212, and a publication component 214. The interface component 202 receives digital broadcast television channel data, analog broadcast television channel data, and program listings for one or more analog broadcast television channels from a content provider. The alignment component 210 matches the digital broadcast television channel data received by the interface component 202 with the analog broadcast television channel data received by the interface component 202. The digital broadcast television channel data identifies one or more digital broadcast television channels. The analog broadcast television channel data identifies the analog broadcast television channels. In one embodiment, the alignment component 210 further maps each of the digital broadcast television channels with at least one of the analog broadcast television channels as a function of the matched digital broadcast television channel data and analog broadcast television data. The guide component 212 generates a list of mapped channels as a function of the matched digital broadcast television channel data and corresponding analog broadcast television channel data and/or the mapped digital broadcast television channels and analog broadcast television channels. The publication component 214 creates a program guide for the digital broadcast television channels as a function of the list of mapped channels generated by the guide component 212 by associating program listings for the analog broadcast television channels with the digital broadcast television channels. The components further include a memory component 216 for storing the program guide created by the publication component in a database for subsequent access in response to a request from a client or other user.

The components illustrated in FIG. 2 represent an exemplary implementation of an embodiment of the invention. The functionality and structure of embodiments of the invention may be organized and implemented by any quantity of modules, components, or the like stored on one or more computer-readable media. For example, the components may be distributed.

The invention further implements a web service interface on the database publication to match the digital channels in a client-specific area with existing analog broadcast listings to return a set of objects including a set of call signs with tuning information for consumption by the client. In one embodiment, the client-specific area is identified by a geographic identifier. The geographic identifier (e.g., postal code) of the user may be obtained, for example, during setup, from billing records, or from a navigation system such as a radio navigation system. The ability to determine digital services by area also enables embodiments of the invention to recommend or promote products and services to customers including appropriate reception equipment (e.g., antennae, cable services), programming that would be available if the customer purchased or leased appropriate hardware, and area based promotions with third party partners.

In one example, a user purchases a new personal computer with multi-tuner capability and is eager to see digital television programs. During setup, the personal computer is identified as having a digital tuner card present. The user is asked for a zip code and presented with an array of cable and terrestrial broadcast stations. However, in addition to downloading an electronic program guide, the personal computer will make a web service interface call (e.g., according to the simple object access protocol) to a service of the inventions. The service returns an array of objects including call letters and tuning information for digital channels available in the user's zip code. Alternatively or in addition, the geographic-specific program listing for the digital channels is generated at night, in the background, during a scheduled polling interval (e.g., every thirty minutes), or in response to a user request, a computer event (e.g., installation of an ATSC tuner card), publication of updated program listings, or publication of updated digital channel tuning information.

The exemplary broadcast video environment also includes a system for producing a program listing for ATSC channels and non-ATSC channels specific to a geographic region associated with the user computing device. The system includes an interface (e.g., interface component 218), a memory area (e.g., database 204), and a processor (e.g., server 220). The interface receives a request from the user computing device 222 via network 224 for a program listing for ATSC channels and non-ATSC channels. The request includes a geographic identifier associated with the user computing device. The memory area (e.g., a database 204) stores a master program listing for ATSC channels and non-ATSC channels. In one embodiment, the memory area is a computer-readable medium storing a data structure representing at least one of the populated objects associated with one of the ATSC channels. The data structure includes a call sign field storing a string value uniquely identifying the ATSC channel, a physical channel field storing data representing a frequency of broadcast for the ATSC channel, and a major channel field storing a numerical value associated with a provider of the ATSC channel. The data structure for the objects further includes one or more minor channel fields each representing a digital broadcast service provided by the provider. The data structure also includes a program listing field storing data describing content broadcast on the frequency of broadcast stored in the physical channel field.

In one embodiment, one or more computer-readable media have computer-executable components for obtaining a geographic-specific program guide for broadcast content. The components include a setup component 225 and an interface component 226. The setup component 225 determines a geographic identifier associated with the user computing device 222 (e.g., a first computing device) and generates a request for a program listing for ATSC and non-ATSC channels. The request includes the determined geographic identifier. The setup component 225 also includes a hardware detection component 227 for detecting an ATSC tuner card 228 in the user computing device 222.

The interface component 226 sends the generated request to the server 220 (e.g., a second computing device) for responding to client requests and receives the requested program listing in response (e.g., via network 224). The received program listing is specific to the determined geographic identifier.

In one embodiment, one or more computer-readable media have computer-executable components for generating a geographic-specific program guide for broadcast content. The components include the interface component 218 and a guide creation component 229. The interface component 218 receives the request from the user computing device 222 for the program listing. The guide creation component 229 filters a master program listing (e.g., a program guide for ATSC and non-ATSC channels stored in database 204) as a function of the geographic identifier received in the request to create the requested program listing. The guide creation component 229, when executed, populates one or more objects with the created program listing. The interface component 218 sends the populated objects to the user computing device 222.

In yet another embodiment, the invention aligns information about the assigned tuner positions for broadcast stations, listing information from a data partner, and geographic availability data to produce a database publication. The invention utilizes database techniques, fuzzy logic, and textual comparison to combine this data and produce a database which can be queried on a set of parameters. The primary query parameter is a geographic identifier which yields a set of stations with attributes such as call sign, major and physical channel numbers that are available in that geographic location. This database is then made available to clients through a variety of mechanisms such as a web service.

Figure 3:
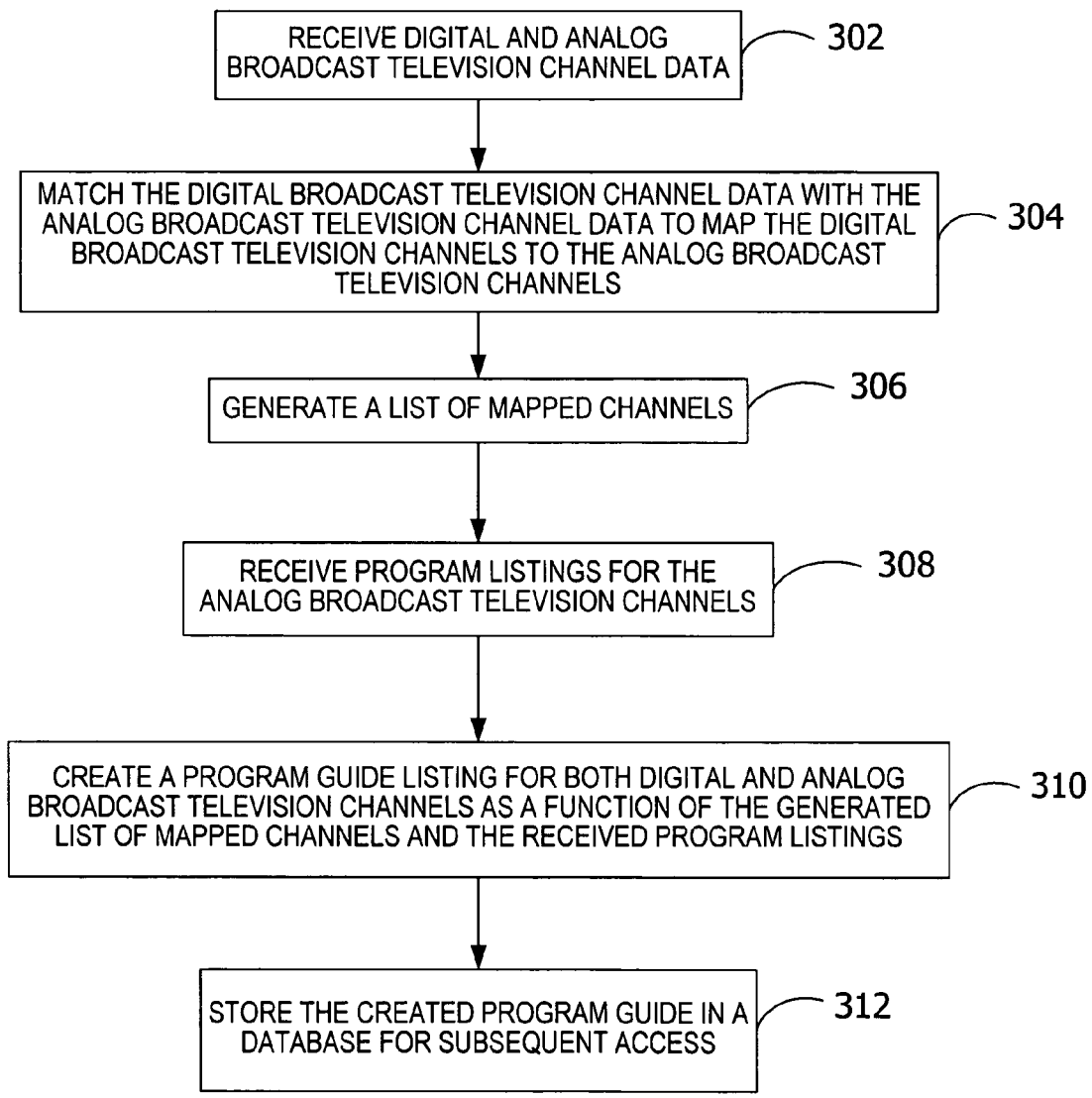
FIG. 3 is an exemplary flow chart illustrating creation of a comprehensive program guide.

Referring next to FIG. 3, an exemplary flow chart illustrates creation of a comprehensive program guide. The method illustrated in FIG. 3 provides content listings for digital television broadcasts. The method includes receiving digital and analog broadcast television channel data at 302. The method includes matching digital broadcast television channel data (e.g., call signs) with corresponding analog broadcast television channel data (e.g., call signs) at 304. The digital broadcast television channel data identifies one or more digital broadcast television channels. The analog broadcast television channel data identifies one or more analog broadcast television channels. The method also includes generating a list of mapped channels at 306 as a function of matching the digital broadcast television channel data with the corresponding analog broadcast television channel data. The generated list of mapped channels maps each of the digital broadcast television channels with at least one of the analog broadcast television channels. The method also includes receiving program listings for the analog broadcast television channels at 308. The method also includes creating a program guide for the digital broadcast television channels at 310 as a function of the generated list of mapped channels by associating program listings for the analog broadcast television channels with the digital broadcast television channels. The method further includes storing the created program guide in a database for subsequent access at 312. One or more computer-readable media have computer-executable instructions for performing the method illustrated in FIG. 3. In one example, server 206 in FIG. 2 performs the method illustrated in FIG. 3.

In particular, the invention imports a list of the digital channels broadcast in the United States from the FCC or another source or provider. The list may include, for example, call signs for the digital channels. In one embodiment, each call sign is a string with up to twenty characters. The invention normalizes the digital call signs associated with the digital channels to match analog call signs and exports those scrubbed digital call signs that match an analog call sign. Normalizing includes, in one example, removing extraneous characters such as DT/-TV to facilitate matching on the client.

In one embodiment, a string comparison is performed on the digital and analog call signs. That is, each digital call sign is compared to each analog call sign to identify a match. String comparisons are well known in the art. Exemplary digital call signs are shown below along with exemplary physical channel values and exemplary major channel values. Digital call signs resemble the corresponding analog call signs in one embodiment.

<c s="KAAL" p="33" m="6"/>
<c s="KABC-TV" p="53" m="7"/>
<c s="KABYDT" p="28" m="9"/>

In addition, a comparison may be made between the frequency of broadcast associated with the digital and analog channels. That is, a correlation exists between the analog broadcast frequency and the digital broadcast frequency of a particular content provider. Comparing and analyzing the analog and digital broadcast frequencies further enables the invention to map the digital channels to the analog channels.

The invention imports program listings for the analog channels to be applied to the simulcast digital channels. The imported program listings include a variety of schedule and program attributes from providers using various data formats. Embodiments of the invention identify attributes of interest to digital consumers. The various attributes of interest enable consumer features such as highlighted/emphasized channels in regular grid, HDTV filtered guide, record/remote record of HD format programming, attribution of HD programming, search for HD programming, and record conflict resolution (a preference for HD programming).

In one embodiment, a computer-readable medium stores thereon a data structure for providing editorial guidance in creating program listings for broadcast content. The data structure has one or more attributes for a particular program listing. The attributes include a program flag name attribute storing a value identifying a rating, a program value attribute storing a value identifying creation data, a program role attribute storing a value identifying credit information, and a program category attribute storing a value identifying genre information. The attributes further include a schedule flag attribute storing a value identifying a runtime characteristic of the particular program listing.

In a specific example, the attributes of interest to digital consumers generally include program flag names such as program star ratings, program rating reasons, program episodic hint, program types, and TV ratings for various countries. Other attributes of interest include program values identifying creation data such as episode identifier, runtime, originating country, or original broadcast date. Still other attributes of interest include program roles identifying credit information such as actor, director, producer, or writer. The program values and program roles are key-value pair associations referenced by an identifier and referring to respective sets of available flags. Yet other attributes of interest include program categories providing genre information such as educational, news, or sports. Boolean flags provide further information about runtime characteristics of the program such as whether a program is closed captioned, a premier, a finale, a miniseries, or broadcast delayed.

The web service implementation described herein is merely exemplary. Other implementations and means for obtaining a geographic-specific program guide covering both digital and analog channels are within the scope of the invention. For example, a server may store a separate program guide for each geographic region and deliver the appropriate guide upon request.

Figure 4:
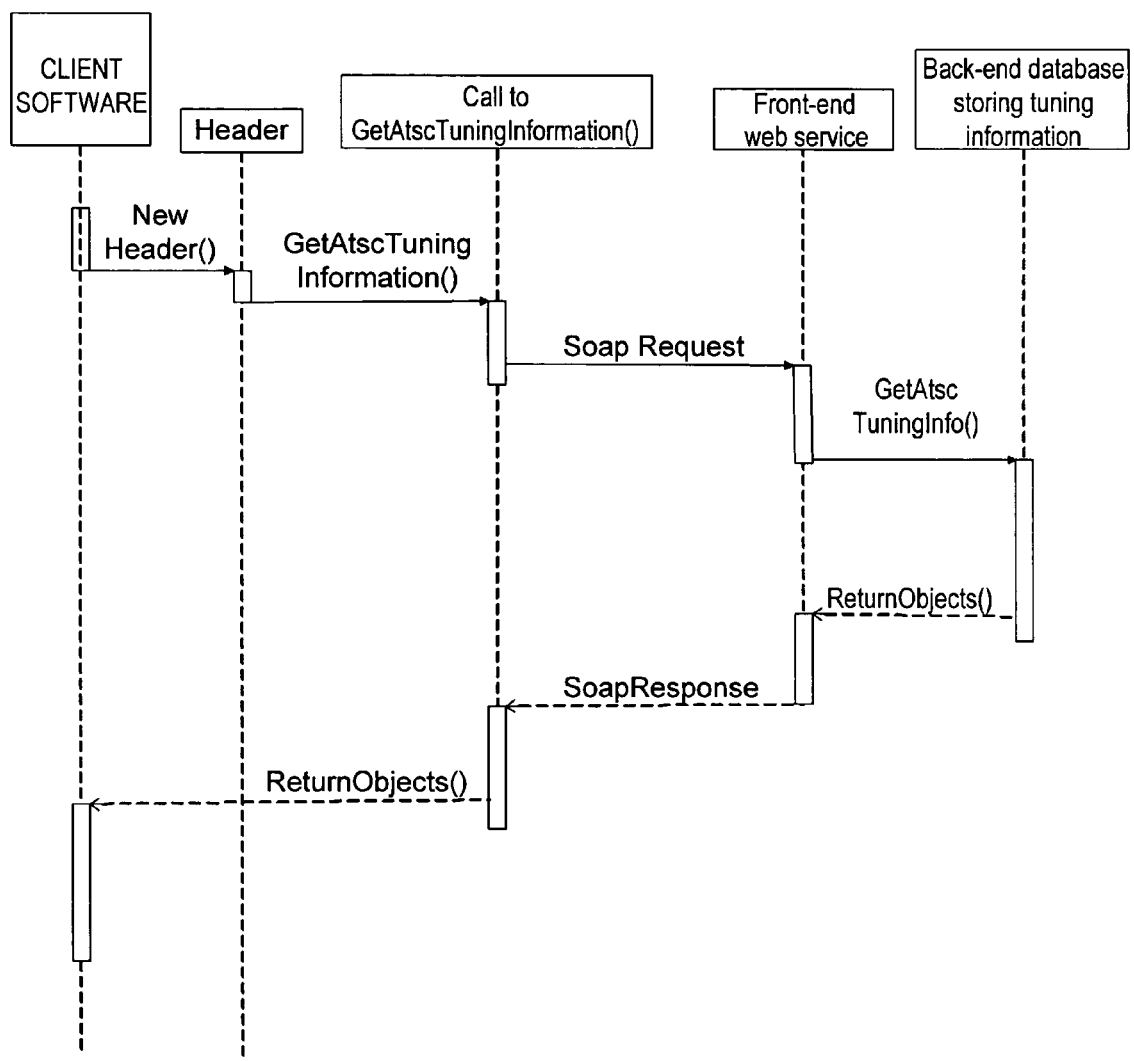
FIG. 4 is an exemplary flow diagram depicting the client-server interaction of the invention.

Referring next to FIG. 4, an exemplary flow diagram depicts the client-server interaction of the invention for obtaining a geographic-specific program guide. In particular, the client determines a geographic identifier for itself. The client generates a request for a program listing for ATSC channels and non-ATSC channels. The request includes the determined geographic identifier. The client sends the generated request to the server. The server has access to a memory area storing the requested program listing.

The server receives the request from the client for the program listing. The server filters a master program listing as a function of the received geographic identifier to create the requested program listing. The server populates one or more objects with the requested program listing. The server sends the populated one or more objects to the first computing device. One or more computer-readable media have computer-executable instructions for performing the method illustrated in FIG. 4. In one example, the server of FIG. 4 is server 220 illustrated in FIG. 2.

In one embodiment, the client-server interaction is based on the simple object access protocol (SOAP). The client constructs a header object for the request and obtains a reference to the web service. The header object may also be used for subsequent calls by interfaces. The client calls a method such as GetAtscTuningInformation() using the header and passing various parameters. The header and/or the various parameters may include a client identifier, a client version, a country code, a geographic identifier, a language identifier, and a headend identifier. The headend identifier describes the program guide software executing on the client. In one embodiment, the parameters are strings.

A front-end server receives the request from the client. The server performs validation on the parameters and triggers exceptions on errors. Once the parameters have been validated by the server, a call is made to a stored procedure in a back-end database storing the tuning information by passing in the headend identifier and the geographic identifier as parameters in one embodiment. The server retrieves the requested information from the back-end database by filtering the tuning information based on the geographic identifier (e.g., the postal or zip code) received in the request. The server constructs an array of objects to return to the client (e.g., via ReturnObjects()) as a SOAP response. In one embodiment, an object is created for each row that is returned from the database setting the attributes to the values read. If there are no rows available in the database an empty array is returned to the client. The array of objects includes, but is not limited to, at least one call sign, major channel, and physical channel. The client assembles the appropriate objects with the data returned from the server. The data is then available in a class object for subsequent use by the client.

Table 1 below defines exemplary types and values for the call sign, physical channel, and major channel objects returned to the client.

TABLE 1

Exemplary Types and Values for the Objects Returned to the Client.

| Attribute | Type | Exemplary Value |
| --- | --- | --- |
| CallSign | String | KING |
| PhysicalChannel | Unsigned integer | 48 |
| MajorChannel | Unsigned integer | 5 |

In one embodiment, the server performs authentication on each client request. In other embodiments, no such authentication is performed. Alternatively or in addition, the client requests are encrypted using any encryption technique known in the art.

Figure 5:
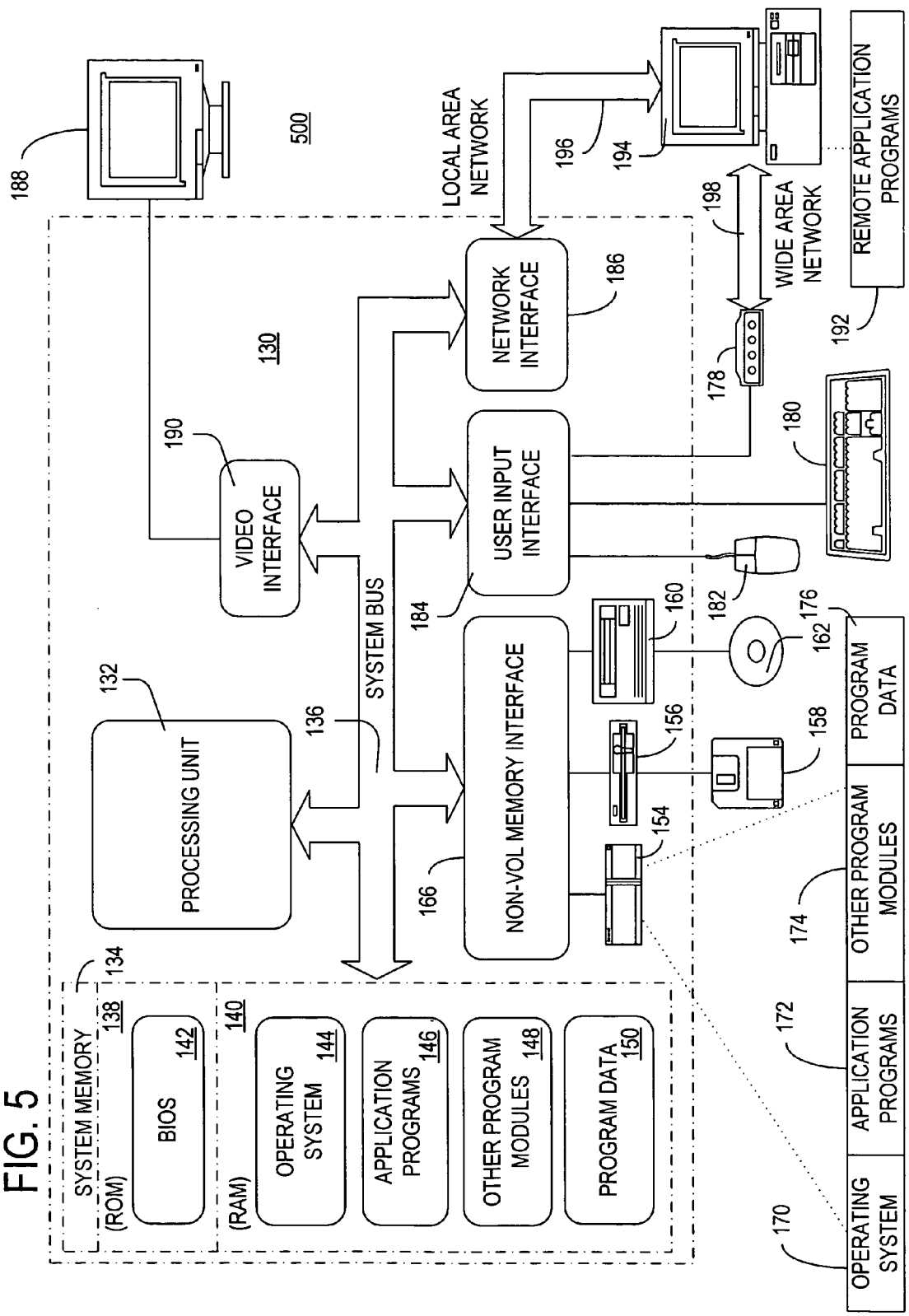
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The invention may be described in terms of a client (e.g., user computing device) requesting and receiving a comprehensive program guide from a server (e.g., the server for responding to requests). However, it is contemplated by the inventors that the invention is operable in other network systems. That is, the invention is not limited to a client/server network system. For example, the invention may be applicable in a peer-to-peer network system.

In operation, computer 130 executes computer-executable instructions such as those illustrated in FIGS. 1, 3, and 4 to obtain or provide content listings for digital television broadcasts.

Figure 6:
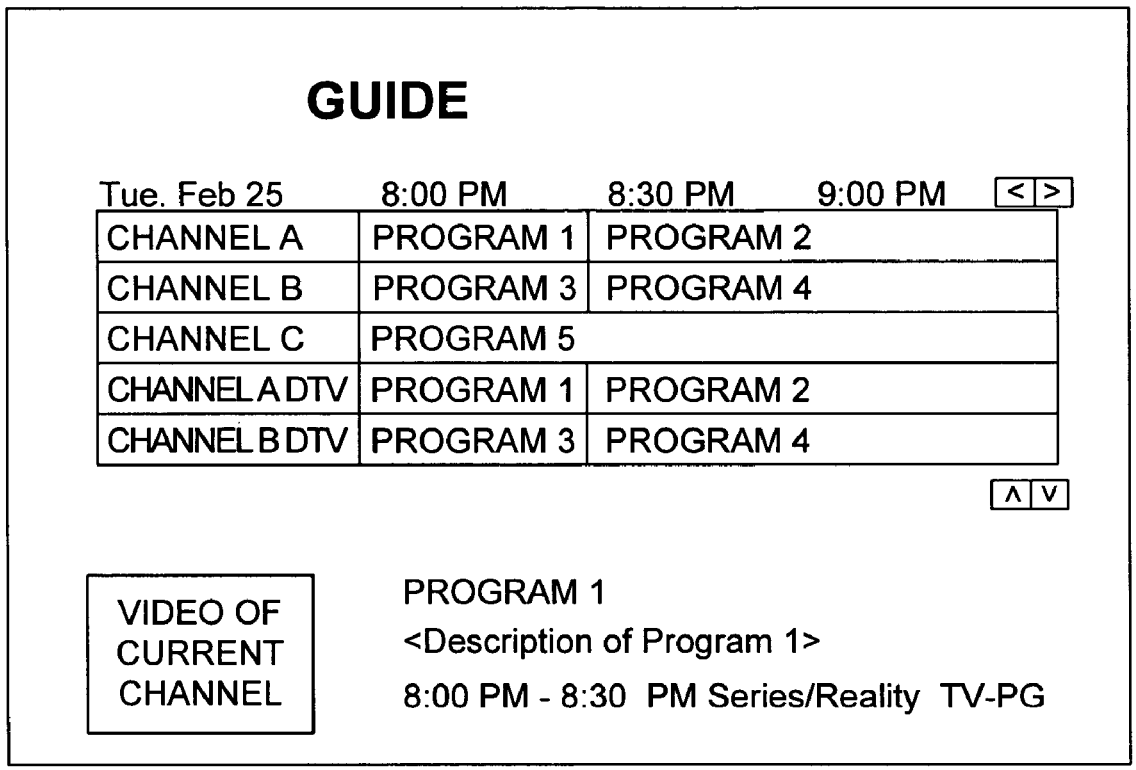
FIG. 6 is a screen shot of an exemplary electronic program guide for display on a client computing device.

The following examples further illustrate the invention. Referring next to FIG. 6, a screen shot illustrates an electronic program guide for display on a client computing device.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

The invention may be described in terms of a client (e.g., user computing device) requesting and receiving a comprehensive program guide from a server (e.g., the server for responding to requests). However, it is contemplated by the inventors that the invention is operable in other network systems. That is, the invention is not limited to a client/server network system. For example, the invention may be applicable in a peer-to-peer network system.

The components illustrated in the figures represent an exemplary implementation of an embodiment of the invention. The functionality and structure of embodiments of the invention may be organized and implemented by any quantity of modules, components, or the like stored on one or more computer-readable media. For example, the components may be distributed.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for obtaining a geographic-specific program guide, said method comprising:
    determining a geographic identifier for a computing device, said geographic identifier indicating a geographic location of the computing device;
    generating a request for a program listing for digital broadcast television channels, said request including the determined geographic identifier;
    sending the generated request to a server, wherein said server accesses a memory area storing programming listings for digital broadcast television channels and analog broadcast television channels, each of said digital and analog broadcast television channels having a call sign associated therewith, each of said programming listings describing content on one of the digital or analog broadcast television channels; and
    receiving, via a web service provided by the server, the requested program listing associated with the geographic location of the computing device, said received program listing comprising the programming listings for only the digital broadcast television channels that are available for the determined geographic identifier indicating the geographic location of the computing device, wherein the programming listing for at least one digital broadcast television channel of said digital broadcast television channels is unavailable in the memory area and wherein the received program listing includes, for the at least one digital broadcast television channel for which the programming listing is unavailable, a programming listing provided by a television station for an analog broadcast television channel corresponding to the at least one digital broadcast television channel as a function of the call signs of sad at least one digital broadcast television channel and said analog broadcast television channel.

2. The method of claim 1, wherein generating the request for the program listing for digital broadcast television channels comprises generating a request for a program listing for digital broadcast television channels conforming to a digital television standard.

3. The method of claim 2, wherein the digital television standard is the Advanced Television Systems Committee (ATSC) standard.

4. The method of claim 1, further comprising detecting an ATSC tuner card in the computing device, and wherein generating the request for the program listing comprises generating the request for the program listing in response to detecting the ATSC tuner card.

5. The method of claim 1, wherein sending the generated request to a server comprises sending the generated request to the server via the simple object access protocol.

6. The method of claim 1, wherein determining the geographic identifier for the computing device comprises determining, with a navigation device, a zip code associated with the computing device.

7. The method of claim 6, wherein determining the location for the mobile television device comprises determining, with a global navigation system, the zip code associated with the computing device.

8. One or more computer-readable storage devices having computer-executable instructions for performing the method recited in claim 1.

9. One or more computer-readable storage devices having computer-executable components for executing on a computing device to obtain a geographic-specific program guide for broadcast content, said components comprising:

a setup component for automatically determining a zip code where the computing device is located and generating a request for a program listing for digital broadcast television channels, said request including the determined zip code; and an interface component for sending the generated request to a server, wherein said server accesses a memory area storing a master program listing for digital broadcast television channels and analog broadcast television channels available for a plurality of zip codes, each of said digital and analog broadcast television channels having a call sign associated therewith, said interface component being further adapted for receiving, from a web service provided by the server, the requested program listing for digital broadcast television channels in the master program listing that are available for the determined zip code, wherein the programming listing for at least one digital broadcast television channel of said digital broadcast television channels is unavailable in the memory area and wherein the received program listing includes, for the at least one digital broadcast television channel for which the programming listing is unavailable, a programming listing provided by a television station for an analog broadcast television channel corresponding to the at least one digital broadcast television channel as a function of the call signs of said at least one digital broadcast television channel and said analog broadcast television channel.

10. The computer-readable storage devices of claim 9, wherein the setup component comprises a hardware detection component for detecting an Advanced Television Systems Committee (ATSC) tuner card in the computing device.

11. A method used by a server to generate a geographic-specific program guide for broadcast content, said method comprising:

receiving a request from a first computing device for a program listing for digital broadcast television channels, said received request including a zip code where the first computing device is located;

filtering a master program listing as a function of the received zip code to create the requested program listing for the digital broadcast television channels that are available for the received zip code, said master program listing including program listings for analog broadcast television channels to be applied to simulcast digital broadcast television channels, each of said program listings including schedule and program attributes for an analog broadcast television channel, wherein said attributes include an episode identifier attribute;

populating one or more objects with the requested program listing for the digital broadcast television channels that are available for the received zip code, wherein said program listing for at least one digital broadcast television channel of said digital broadcast television channels is unavailable in the master program listing, and wherein the programming listing populated for at least one digital broadcast television channel is a program listing for an analog broadcast television channel that is simulcast with the at least one digital broadcast television channel and corresponds to said at least one digital broadcast television channel as a function of the call signs that are associated with said at least one digital broadcast television channel and said analog broadcast television channel; and providing the populated one or more objects to the first computing device via a web service.

12. The method of claim 11, wherein filtering the master program listing comprises filtering the master program listing stored in a database.

13. The method of claim 11, wherein receiving the request from the first computing device comprises receiving the request from the first computing device via the simple object access protocol.

14. The method of claim 11, wherein sending the populated one or more objects to the first computing device comprises sending the populated one or more objects to the first computing device via the simple object access protocol.

15. The method of claim 11, wherein the digital broadcast television channels conform to the Advanced Television Systems Committee (ATSC) standard.

16. One or more computer-readable storage devices having computer-executable instructions for performing the method recited in claim 11.

17. One or more computer-readable storage devices associated with a server, said computer-readable storage devices having computer-executable components for generating a geographic-specific program guide for broadcast content, said components comprising:

an interface component for receiving a request from a first computing device for a program listing for digital broadcast television channels, said received request including a zip code where the first computing device is located; and a guide creation component for filtering a master program listing as a function of the received zip code to create the requested program listing for the digital broadcast television channels that are available for the received zip code and populating one or more objects with the requested program listing for the digital broadcast television channels that are available for the received zip code, wherein said program listing for at least one digital broadcast television channel of said digital broadcast television channels is unavailable in the master program listing, and wherein the programming listing populated for at least one digital broadcast television channel is a program listing provided by a television station for an analog broadcast television channel, that is simulcasted with the at least one digital broadcast television channel; and corresponds to said at least one digital broadcast television channel as a function of the call signs that are associated with said at least one digital broadcast television channel and said analog broadcast television channel.

18. The computer-readable storage devices of claim 17, wherein the interface component is further adapted to send the populated one or more objects to the first computing device.

19. The computer-readable storage devices of claim 17, wherein the digital broadcast television channels conform to the Advanced Television Systems Committee (ATSC) standard.

20. A system for producing a program listing for digital broadcast television channels and analog broadcast television channels specific to a geographic region associated with a computing device, said system comprising:

a first network server connected to a data communication network, said first network server including:

an interface for receiving digital broadcast television channel data and analog broadcast television channel data from a provider, wherein said digital broadcast channel data includes a plurality of digital call signs, each of the plurality of digital call signs being a text string that identifies a digital broadcast television channel, wherein said analog broadcast television channel data includes a plurality of analog call signs, each of the plurality of analog channel call signs being a text string that identifies an analog broadcast television channel;

a processor configured to execute computer-executable instructions to compare each of the digital call signs to each of the analog call signs to identify matches there between; said processor being further configured to map each of the digital broadcast television channels with the one or more analog broadcast television channels identified as having a call sign that matches the call sign of said digital broadcast television channel, said processor being further configured to generate a program guide for the digital broadcast television channels by associating program listings for the analog broadcast television channels mapped to the digital broadcast television channels; and a memory area for storing the generated program guide; and a second network server connected to the data communication network, said second network server including:

an interface for receiving a web service interface call from a computing device requesting a program listing for digital broadcast television channels, said call including a zip code associated with the computing device;

a processor configured to execute computer-executable instructions to filter the generated program guide stored in the memory area as a function of the zip code in the call received by the interface to create the requested program listing for the digital broadcast television channels available for the zip code, wherein the requested program listing for at least one digital broadcast television channel is unavailable in the memory area and wherein the received program listing includes, for the at least one digital broadcast television channel is a program listing provided by a television station for an analog broadcast television channel corresponding to the at least one digital broadcast television channel as a function of the channel call signs of said at least one digital broadcast television channel and said analog broadcast television channel;

said processor being further configured to execute computer-executable instructions to populate one or more objects with the program listing created by the processor for accessing by the client computing device via a web interface.

21. The system of claim 20, wherein the memory area comprises a database storing the master program listing.

22. The system of claim 20, wherein the memory area comprises a computer-readable medium having stored thereon a data structure representing at least one of the populated objects associated with one of the digital broadcast television channels, said data structure comprising:

a call sign field storing a string value uniquely identifying the digital broadcast television channel;

a physical channel field storing data representing a frequency of broadcast for the digital broadcast television channel; and a major channel field storing a numerical value associated with a provider of the digital broadcast television channel.

23. The system of claim 22, wherein the data structure further comprises one or more minor channel fields each representing a digital broadcast service provided by the provider.

24. The system of claim 22, wherein the data structure further comprises a program listing field storing data describing content broadcast on the frequency of broadcast stored in the physical channel field.

25. The system of claim 22, wherein the digital broadcast television channels conform to the Advanced Television Systems Committee (ATSC) standard.

* * * * *